(12) United States Patent
Sim et al.

(10) Patent No.: US 9,490,628 B2
(45) Date of Patent: Nov. 8, 2016

(54) FAULT CURRENT LIMITER

(71) Applicant: LSIS CO., LTD., Anyang-si, Gyeonggi-do (KR)

(72) Inventors: Jung Wook Sim, Cheongju-si (KR); Gyeong Ho Lee, Cheongju-si (KR); Hae Yong Park, Changwon-si (KR)

(73) Assignee: LSIS CO., LTD., Anyang-si (KR)

( * ) Notice: Subject to any disclaimer, the term of this patent is extended or adjusted under 35 U.S.C. 154(b) by 72 days.

(21) Appl. No.: 14/528,949

(22) Filed: Oct. 30, 2014

(65) Prior Publication Data

US 2015/0138683 A1 May 21, 2015

(30) Foreign Application Priority Data

Nov. 15, 2013 (KR) .................. 10-2013-0138990

(51) Int. Cl.
*H02H 9/02* (2006.01)
*H01H 9/54* (2006.01)
*H01H 33/02* (2006.01)
*H02H 3/08* (2006.01)
*H02H 3/02* (2006.01)

(52) U.S. Cl.
CPC .............. *H02H 9/02* (2013.01); *H01H 9/54* (2013.01); *H01H 33/02* (2013.01); *H02H 3/08* (2013.01); *H02H 9/026* (2013.01); *H02H 3/025* (2013.01)

(58) Field of Classification Search
USPC .................. 361/11, 93.9, 19, 113
See application file for complete search history.

(56) References Cited

U.S. PATENT DOCUMENTS

| | | | |
|---|---|---|---|
| 4,464,621 A * | 8/1984 | Prigent ............. | H04M 3/301 324/522 |
| 4,583,146 A * | 4/1986 | Howell .............. | H01H 9/42 361/11 |
| 4,816,958 A * | 3/1989 | Belbel .............. | H01H 33/161 361/11 |
| 5,805,393 A * | 9/1998 | Thomas ............. | H02H 9/026 361/13 |
| 6,437,955 B1 * | 8/2002 | Duffy ............... | H02H 3/025 361/113 |
| 8,077,438 B2 * | 12/2011 | Sim ................. | H02H 9/02 361/19 |
| 8,194,378 B2 * | 6/2012 | Hyun ............... | H02H 9/02 361/93.9 |
| 8,488,285 B2 * | 7/2013 | Divan .............. | H02H 9/001 361/58 |
| 8,745,322 B2 * | 6/2014 | Conley ............. | G06F 12/0246 711/100 |
| 9,240,681 B2 * | 1/2016 | Rajput-Ghoshal ..... | H02H 7/001 |
| 2008/0160370 A1 | 7/2008 | Masse et al. | |
| 2009/0040664 A1 * | 2/2009 | Higuchi ............ | G01R 33/3806 361/19 |
| 2009/0052097 A1 * | 2/2009 | Hyun ............... | H02H 7/001 361/19 |

(Continued)

FOREIGN PATENT DOCUMENTS

| | | |
|---|---|---|
| DE | 10-2011-056577 | 5/2013 |
| EP | 2410551 | 1/2012 |
| EP | 2549501 | 1/2013 |

OTHER PUBLICATIONS

European Patent Office Application Serial No. 14192762.4, Search Report dated Mar. 30, 2015, 8 pages.

*Primary Examiner* — Thienvu Tran
*Assistant Examiner* — Angela Brooks
(74) *Attorney, Agent, or Firm* — Lee Hong Degerman Kang & Waimey

(57) ABSTRACT

A fault current limiter is provided. According to an embodiment of the present disclosure, the fault current limiter includes a switch whose contact point is opened when a fault current occurs; a current limiting element configured to limit the fault current when the fault current occurs; and a diode being serial-connected to the current limiting element, wherein a breakdown voltage of the diode is higher than a voltage drop by an impedance of the switch when a normal current flows.

8 Claims, 2 Drawing Sheets

(56) References Cited

U.S. PATENT DOCUMENTS

| | | | | |
|---|---|---|---|---|
| 2010/0110598 A1* | 5/2010 | Hyun | ............. | H02H 9/02 361/93.9 |
| 2013/0021705 A1* | 1/2013 | Sim | ............. | H02H 9/02 361/93.9 |
| 2013/0021706 A1* | 1/2013 | Sim | ............. | H01H 9/541 361/93.9 |
| 2014/0168830 A1* | 6/2014 | Vangool | ............. | H01H 83/04 361/47 |
| 2014/0293666 A1* | 10/2014 | Merz | ............. | H01H 9/42 363/50 |

* cited by examiner

FAULT CURRENT LIMITER

CROSS-REFERENCE TO RELATED APPLICATION

Pursuant to 35 U.S.C. §119(a), this application claims the benefit of earlier filing date and right of priority to Korean Application No. 10-2013-0138990, filed on Nov. 15, 2013, the contents of which is incorporated by reference herein in its entirety.

BACKGROUND

1. Field of the Disclosure

The present disclosure relates to a fault current limiter. More specifically, the present disclosure relates to a fault current limiter used in a system such as electric power equipment.

2. Description of Related Art

Generally, a fault current limiter is a device protecting equipment in an electric power system by converting fault current (which occurs in accidents such as thunderstroke, grounding, and short-circuit) into normal current. Recently, various types of fault current limiters are used in related fields. The types of fault current limiter may be categorized by elements used therein, for a non-limiting example, superconductors, power semiconductors, saturated iron cores, etc.

Usually, a fault current limiter is formed of a main path and a current limiting path. The main path senses fault current when normal current is conducted, then limits or blocks the fault current at an initial stage. Being parallelly connected to the main path, the current limiting path limits or blocks the fault current by handling the fault current and the burden voltage of the main path.

When normal current flows, all the current flows to the main path, however, the current may flow to the current limiting path due to impedance difference between the parallel-connected main path and current limiting path.

FIG. 1 is a block diagram illustrating a general fault current limiter.

As shown in FIG. 1, the general fault current limiter includes a main path M and a current limiting path L. When a normal current flows, the current $I_{tot}$ splits into a main path current $I_1$ and a current-limiting path current $I_2$ by impedance difference between the main path M and current limiting path L.

At this time, the current limiting element (100) is heated by the current limiting path current $I_2$. The larger current $I_{tot}$ flows, a more current will flow to the current limiting path L.

Thus, because the current-limiting path current $I_2$ flowing in the current limiting path L acts as a loss and may impose restrictions on current limiting operations, a switch is often installed on the current limiting path L in order to block the current flowing to the current limiting path L when normal current flows.

However, in this case when there is a problem that a separate additional control circuit is required in order to open the switch on the current limiting path L at the proper time so that the fault current may detour from the main path M to the current limiting path L when the fault current occurs.

SUMMARY OF THE DISCLOSURE

The technical challenge which the present disclosure intends to achieve is, by using a power diode and designing breakdown voltage of the diode on the current limiting path to be higher than voltage drop of the main path, to provide a fault current limiter switching the fault current from the main path to the current limiting path when the fault current occurs. Otherwise, the current is not flowing to the current limiting path in a normal state.

In one general aspect of the present disclosure, there may be provided a fault current limiter, the limiter comprising: a switch whose contact point is opened when a fault current occurs; a current limiting element configured to limit the fault current when the fault current occurs; and a diode being serial-connected to the current limiting element, wherein a breakdown voltage of the diode is higher than a voltage drop by an impedance of the switch when a normal current flows.

In some exemplary embodiment of the present invention, the diode may turned-on when a voltage generated after the switch is opened due to the fault current is higher than the breakdown voltage of the diode.

In another general aspect of the present invention, there may be provided a fault current limiter, the limiter comprising: a measuring unit configured to measure a current; a detecting unit configured to transmit an opening signal for opening a switch and a turn-off signal for turning off a power semiconductor when a fault current is determined to occur by the measuring unit; the switch configured to open the contact point by the opening signal; the power semiconductor serial-connected to the switch to form a main path and configured to be turned off by the turn-off signal; a current limiting element configured to limit the fault current; and a diode serial-connected to the current limiting element to form a limiting path and configured to block a normal current into the limiting path.

In some exemplary embodiment of the present invention, the diode may include a first diode in forward direction; and a second diode parallel-connected to first diode in reverse direction In some exemplary embodiment of the present invention, a breakdown voltage of the diode may be higher than a voltage drop by an impedance of the main path when the normal current flows.

In some exemplary embodiment of the present invention, a breakdown voltage of the diode may be higher than a voltage drop by an impedance of the power semiconductor and the switch when the normal current flows.

In some exemplary embodiment of the present invention, the current limiting element may include: a first power fuse configured to block the fault current into the limiting path; a first resistor unit parallel-connected to the first power fuse and configured to block the fault current after the first power fuse is fused; and a second power fuse serial-connected to the first resistor unit and configured to block the fault current after passing through the first resistor unit.

In some exemplary embodiment of the present invention, the limiter may further comprise a second resistor unit disposed between the diode and the current limiting element and configured to limit a first peak current of the fault current.

In some exemplary embodiment of the present invention, a connection between the diode and the second resistor unit may be parallel-connected to the power semiconductor and the current limiting element may be parallel-connected to the switch.

In some exemplary embodiment of the present invention, a voltage drop by resistance of the second resistor unit may be smaller than that of the power semiconductor.

In some exemplary embodiment of the present invention, the detection unit may be further configured to transmit the opening signal before the turn-off signal.

According to an embodiment of the present disclosure as described in the above, the current which unnecessarily flows to the fault current limiting path when the current normally flows can be easily blocked without any additional control burdens, by arranging a diode having higher breakdown voltage than a voltage drop of the main path in a normal state onto the fault current limiting path.

In addition, according to an embodiment of the present disclosure, when a fault current occurs, the fault current can be switched to the fault current limiting path without any additional control burdens, by turning-on the diode on the fault current limiting path due to voltage rise of the main path.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the example embodiments set forth herein. Rather, the described aspect is intended to embrace all such alterations, modifications, variations, and equivalents that fall within the scope and novel idea of the present disclosure.

The fault current limiter according to an embodiment of the present disclosure designs breakdown voltage of the diode on the limiting path to be higher than voltage drop of the main path, by using a power diode. That is, by designing the breakdown voltage of the diode on the limiting path to be higher than voltage drop of the main path, while no current flows to the limiting path the in a normal state, a fault current may be switched to detour from the main path to the limiting path when the fault current occurs.

That is, according to an embodiment of the present disclosure, when voltage drop of the main path becomes higher than breakdown voltage of the diode on the limiting path, the diode on the limiting path may be electrically conducted on, so that the fault current flowing to the main path may be easily directed to the limiting path.

Hereinafter, referring to enclosed figures, an exemplary embodiment of the present disclosure will be described in detail.

Figure 2:
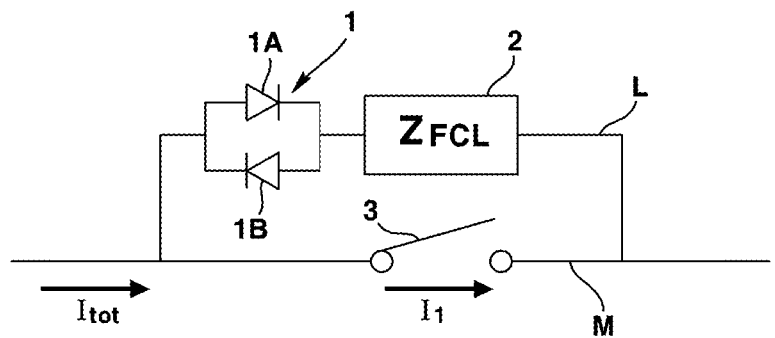
FIG. 2 is a block diagram illustrating a fault current limiter according to an embodiment of the present disclosure.

FIG. 2 is a block diagram illustrating a fault current limiter according to an embodiment of the present disclosure.

As shown in FIG. 2, the fault current limiter according to an embodiment of the present disclosure is formed of a main path M and a limiting path L. The limiting path L includes a diode (1) and a current limiting element (2), and the main path M includes a switch (3).

Figure 3:
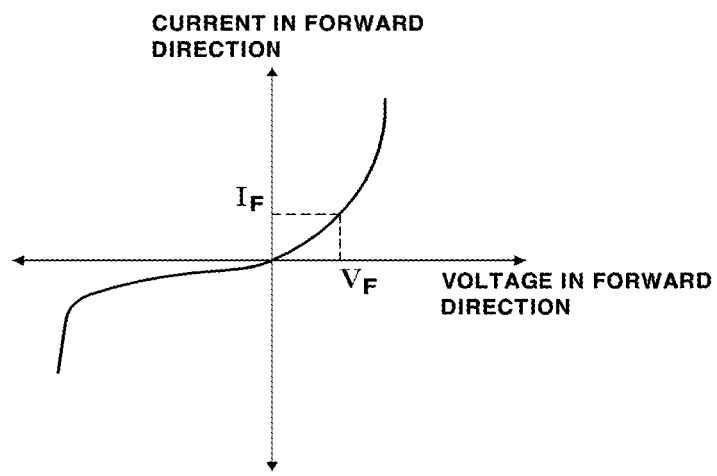
FIG. 3 is an exemplary view illustrating basic operation of a diode.

FIG. 3 is an exemplary view illustrating basic operation of a diode. As shown in the figure, the diode is not electrically conducted until voltage across the diode reaches up to at least the breakdown voltage VF, even when the current is flowing in forward direction.

Figure 1:
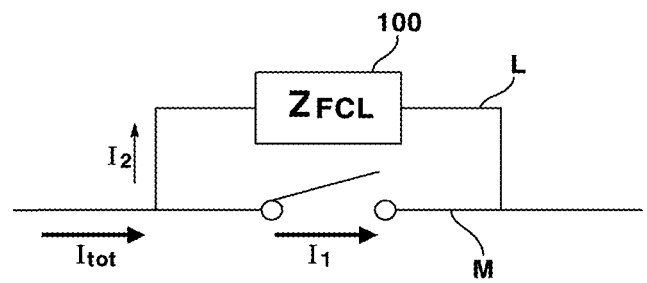
FIG. 1 is a block diagram illustrating a general fault current limiter.

Therefore, the present disclosure is to apply this characteristic of the diode to a fault current limiter. That is to say, the diode (1) is arranged additionally onto the limiting path L of a conventional fault current limiter as FIG. 1. And by designing the diode 1 to have higher breakdown voltage than a voltage drop due to impedance of the main path M when normal current flows, the diode (1) may be turned on without any additional control burdens, at the moment when an accident occurs and the voltage generated by operation of the switch (3) on the main path M reaches up to higher than the breakdown voltage of the diode connected parallelly to the main path M.

Meanwhile, because generally alternating current (AC) is inputted to a fault current limiter, the diode (1) includes a first diode (1A) connected in forward direction and a second diode (1B) connected in reverse direction which is parallel-connected to the first diode (1A). By such a structure of the present disclosure, only the first diode (1A) connected in forward direction is conducted when a current is flowing in forward direction, otherwise, only the second diode (1B) connected in reverse direction is conducted when a current is flowing in reverse direction.

Figure 4:
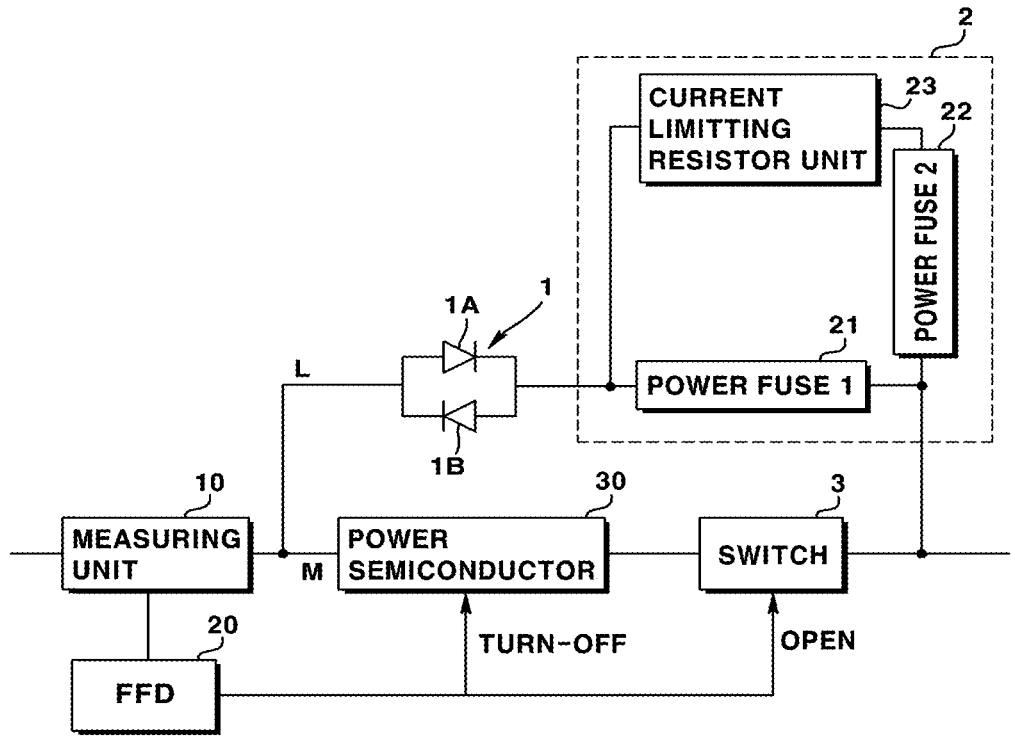
FIG. 4 is a block diagram illustrating a fault current limiter according to another embodiment of the present disclosure.

FIG. 4 is a block diagram illustrating a fault current limiter according to another embodiment of the present disclosure.

As illustrated, the fault current limiter according to an embodiment of the present disclosure includes a measuring unit (10), a fast failure detector (FFD, 20), a power semiconductor (30), a switch (3), a current limiting element (2), and a diode (1). The current limiting element (2) includes a first power fuse (21), a second power fuse (22), and a resistor unit (23). The structure of the current limiting element (2) in the present disclosure is exemplary, and not excluding other various types of current limiting elements.

The power semiconductor (30) and the switch (3) form a main path M by being serially connected to each other. The diode (1) and the current limiting element (2) form a limiting path L by being serially connected to each other. In addition, in the current limiting element (2), the resistor unit (23) and the second power fuse (22) are serially connected, and the serial connection of the resistor unit (23) and the second power fuse (22) is connected to the first power fuse (21) in parallel.

The measuring unit (10) measures current and increment of the current. The measuring unit (10) may be, for example, a current transformer (CT) or a Rogowski coil, which are well known to the skilled in the art such that no more detailed explanation will be made thereto. However, the measuring unit (10) is neither limited to the example embodiments set forth herein, nor excluding other various types of current limiting elements performing similar functions.

When the measuring unit (10) detects a failure by measuring the current increment (that is, when a failure current occurs), the FFD (20) transmits an opening signal for opening a switch (3) to the switch (3), and a turn-off signal for turning off the power semiconductor (30) to the power semiconductor (30).

The power semiconductor (30) maintains to be turned-on in a normal state. Then, when a fault current occurs, the power semiconductor (30) changes to be turned-off by receiving the turn-off signal from the FFD (20). Here, for example, the power semiconductor (30) may be an insulated gate bipolar transistor (IGBT), but not limited hereto. Therefore, other suitable types of semiconductors such as gate turn-off thyristor (GTO) or integrated gate commutated thyristor (IGCT) may be used. Meanwhile, although it is described that a single power semiconductor is provided in an embodiment of the present disclosure, a plurality of serial-connected power semiconductors may be provided. The number of serial-connected power semiconductors may be determined by the amount of the voltage drop which the power semiconductor is required to be capable of when a fault current occurs.

The switch (3) protects the power semiconductor (30) by maintaining insulation at high speed.

Referring to FIG. 2 again, the diode (1) is designed to have higher breakdown voltage than a voltage drop by the power semiconductor (30) and the switch (3) on the main path M in a normal state, and to block the current into the limiting path L.

The first power fuse (21) which is parallel-connected to the current limiting resistor unit (23) blocks the fault current inputted to the limiting path L, and then diverts the fault current to the current limiting resistor unit (23). The first power fuse (21) may be designed to be capable of blocking large amount of the fault current.

In general, a power fuse is a fuse for short circuit protection of high voltage and extra high voltage equipment, and is categorized into two types of current limiting type and non-current limiting type according to its arc extinguishing type. The current limiting power fuse forcibly limits and blocks the fault current by generating high arc resistance. The power fuses are small and cheap, and in addition, have a feature to completely block the target at overcurrent exceeding a certain value without any malfunction.

The first power fuse (21) having such a feature blocks the fault current inputted to the limiting path L at first, and then diverts the fault current to the current limiting resistor unit (23) at the fusing moment of the first power fuse (21).

Being serially connected to the current limiting resistor unit (23), the second power fuse (22) also blocks the fault current which is inputted to the limiting path L and passing through the current limiting resistor unit (23). The second power fuse (22) may be designed to block smaller amount of fault current comparing to the first power fuse (21). The fault current inputted to the second power fuse (22) is the fault current which is remaining from being blocked by the first power fuse (21) at first, and then being forced to heat by the current limiting resistor unit (23) after the first power fuse (21) is fused off.

The first and the second power fuses (21 and 22) are electric power devices each having the same functional capability. However, in particular, the first power fuse (21) diverts the fault current to the current limiting resistor unit (23), while the second power fuse (22) blocks the fault current completely.

The current limiting resistor unit (23) is a resistor for limiting the fault current inputted, and blocks the fault current in cooperation with the second power fuse (22). The resistance of the current limiting resistor unit (23) may be determined in consideration of its cooperation with the second power fuse (22).

Hereinafter, operation of the fault current limiter illustrated in FIG. 4 will be described.

In a normal state, all the current is supposed to flow on the main path M which is connecting the power semiconductor (30) and the switch (3). Whereas on the limiting path L the current is blocked by the diode (1) which is designed to have higher breakdown voltage than a voltage drop of the main path M.

When a fault current occurs, the FFD (20) transmits an opening signal to the switch (3). The contact point of the switch (3) is opened by the opening signal. At the moment when the contact point of the switch (3) is opened, an arc current flows at the contact point of the switch (3). At the moment when the voltage drop generated by the arc impedance becomes higher than the breakdown voltage of the diode (1) on the limiting path L, the fault current flows on the limiting path L.

After the switch (3) on the main path M is opened, and while the gap between contact points of the switch (3) is being broadened, the FFD (20) transmits a turn-off signal for turning off the power semiconductor (30), which is turned off by the turn-off signal. The current on the main path M is hereby blocked, and the arc at the contact point of the switch (3) is eliminated accordingly.

Therefore, the fault current is forced to flow on the limiting path L, then after a certain period of time, the first power fuse (21) is fused off. And at the same time, the fault current is then forced to flow to the current limiting resistor unit (23). The fault current is limited according to quantity of the impedance at the current limiting resistor unit (23). After passing through the current limiting resistor unit (23), the fault current is forced to flow to the second power fuse (22), which may be also fused off after a certain period of time.

As described in the above, according to an embodiment of the present disclosure as described in the above, the current which unnecessarily flows to the limiting path when the current is normally conducted can be easily blocked without any additional control burdens, by arranging a diode having higher breakdown voltage than a voltage drop of the main path in a normal state onto the limiting path. And when a fault current occurs, the fault current can be switched to the limiting path without any additional control burdens, by turning-on the diode on the limiting path due to voltage rise of the main path.

Figure 5:
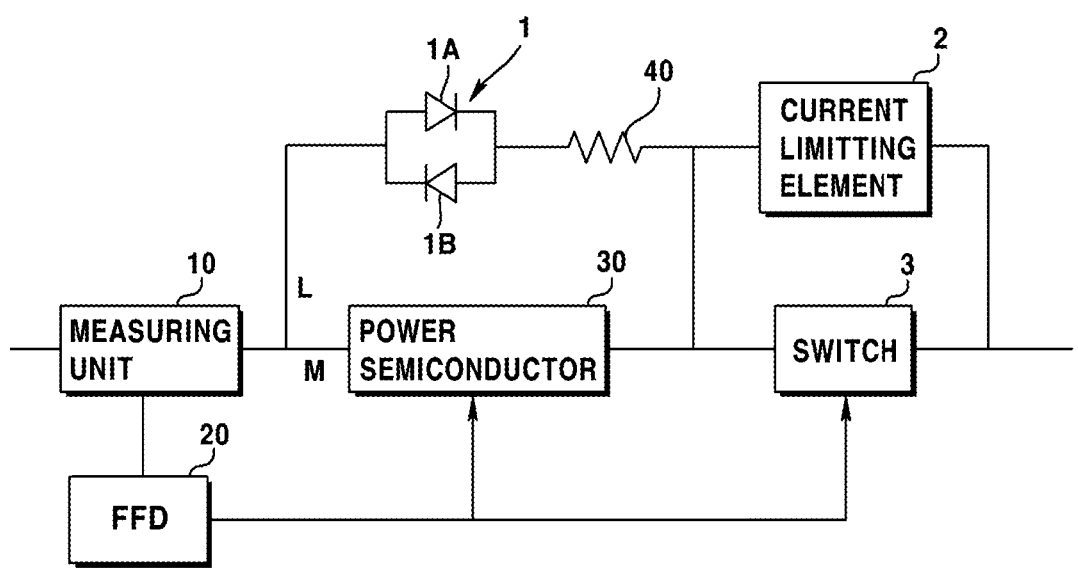
FIG. 5 is a block diagram illustrating a fault current limiter according to still another embodiment of the present disclosure.

FIG. 5 is a block diagram illustrating a fault current limiter according to still another embodiment of the present disclosure.

As illustrated, the fault current limiter according to an embodiment of the present disclosure includes a measuring unit (10), a fast failure detector (FFD, 20), a power semiconductor (30), a switch (3), a diode (1), a peak current limiting resistor (PCR, 40), and a current limiting element (2). The current limiting element (2) may, although it is illustrated and described as a single element herein, include a plurality of elements forming a circuit. The fault current limiter illustrated in FIG. 5 has the same structure with the fault current limiter illustrated in FIG. 4, except that a PCR (40) is additionally used and the power semiconductor (30) and the switch (3) are separated in the former. Therefore, the difference from the latter (the fault current limiter illustrated in FIG. 4) will be mainly described hereinafter.

In the fault current limiter according to an embodiment of the present disclosure, the switch (3) and the fault current limiter (2) may be parallelly connected, and the diode (1) and the PCR (40) may be serially connected. The serial connection of the diode (1) and the PCR (40) may be parallelly connected to the power semiconductor (30).

The PCR (40) is for limiting voltage drop of the power semiconductor (30) when a fault current occurs. The PCR (40) limits the first peak current inputted due to turn-on of the diode (1), and then force the later-inputted current to flow to the current limiting element (2). As this is for reducing burden voltage of the power semiconductor (30), the voltage drop due to the resistor of the PCR (40) shall be designed to be lower than the voltage drop of the power semiconductor (30).

Hereinafter, operation of the fault current limiter illustrated in FIG. 5 will be described.

In a normal state, all the current flows on the main path M connecting the power semiconductor (30) and the switch (3). Whereas on the limiting path L the current is blocked by the diode (1) which is designed to have higher breakdown voltage than a voltage drop of the main path M.

When a fault current occurs, the FFD (20) transmits an opening signal to the switch (3). The contact point of the switch (3) is opened by the opening signal. At the moment when the contact point of the switch (3) is opened, an arc current flows at the contact point of the switch (3). At the moment when the voltage drop generated by the arc impedance becomes higher than the breakdown voltage of the diode (1) on the limiting path L, the fault current flows on the limiting path L.

After the switch (3) on the main path M is opened, and while the gap between contact points of the switch (3) is being broadened, the FFD (20) transmits a turn-off signal for turning off the power semiconductor (30), which is turned off by the turn-off signal. The current on the main path M is hereby blocked, and the arc at the contact point of the switch (3) is eliminated accordingly.

Therefore, the fault current is forced to flow on the limiting path L, then the PCR (40) limits the first peak current inputted, and then force the later-inputted current to flow to the current limiting element (2). The current limiting element (2) may be identical to the circuit illustrated in FIG. 4, or may be different. If the current limiting element (2) is identical to the circuit illustrated in FIG. 4, its operation is also identical.

As described in the above, the PCR (40) limits voltage drop of the power semiconductor (30) when a fault current occurs.

According to an embodiment of the present disclosure, each of the power semiconductor (30) and the switch (3) may be in separated circuits. If the circuit between the power semiconductor (30) and the switch (3) is not separated, the power semiconductor (30) shall be designed to bear against the voltage drop of the current limiting element (2) also. Therefore, quite a number of power semiconductors (30) may be required.

However, if the circuit between the power semiconductor (30) and the switch (3) is separated, the voltage drop of the power semiconductor (30) may be limited using the PCR (40), so that the number of serial-connected power semiconductors (30) may be reduced.

However, if the number of serial-connected power semiconductors (30) is reduced, the resistance value of the PCR (40) is reduced accordingly. In this case, limitation of the first peak current is restricted, because the higher system voltage is the lower resistance value of the PCR (40) is. However, after the first peak current, the fault current is limited by the current limiting element (2), and the switch (3) handles the voltage drop of the current limiting element (2). Thus, the power semiconductor (3) may be arranged in the circuit inside the current limiting element (2).

The abovementioned embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims.

What is claimed is:

1. A fault current limiter, the limiter comprising:
   a measuring unit configured to measure a current;
   a detecting unit configured to transmit an opening signal for opening a switch and a turn-off signal for turning off a power semiconductor when a fault current is determined to occur by the measuring unit;
   the switch configured to open the contact point by the opening signal;
   the power semiconductor serial-connected to the switch to form a main path and configured to be turned off by the turn-off signal;
   a current limiting element configured to limit the fault current;
   a diode serial-connected to the current limiting element to form a limiting path and configured to block a normal current into the limiting path; and
   a second resistor unit disposed between the diode and the current limiting element and configured to limit a first peak current of the fault current.

2. The limiter of claim 1, wherein the diode includes:
   a first diode in forward direction; and
   a second diode parallel-connected to first diode in reverse direction.

3. The limiter of claim 1, wherein a breakdown voltage of the diode is higher than a voltage drop by an impedance of the main path when the normal current flows.

4. The limiter of claim 1, wherein a breakdown voltage of the diode is higher than a voltage drop by an impedance of the power semiconductor and the switch when the normal current flows.

5. The limiter of claim 1, wherein the current limiting element includes:
   a first power fuse configured to block the fault current into the limiting path;
   a first resistor unit parallel-connected to the first power fuse and configured to block the fault current after the first power fuse is fused; and
   a second power fuse serial-connected to the first resistor unit and configured to block the fault current after passing through the first resistor unit.

6. The limiter of claim 1, wherein a connection between the diode and the second resistor unit is parallel-connected to the power semiconductor and the current limiting element is parallel-connected to the switch.

7. The limiter of claim 1, wherein a voltage drop by resistance of the second resistor unit is smaller than that of the power semiconductor.

8. The limiter of claim 1, wherein the detection unit is further configured to transmit the opening signal before the turn-off signal.

\* \* \* \* \*